(12) United States Patent
Krämer et al.

(10) Patent No.: US 8,371,025 B2
(45) Date of Patent: Feb. 12, 2013

(54) APPARATUS FOR REPAIRING A DAMAGED AREA IN AN UNDERWATER WALL REGION OF A VESSEL OR POOL

(75) Inventors: Georg Krämer, Wiesenttal (DE); Konrad Meier-Hynek, Herzogenaurach (DE)

(73) Assignee: Areva NP GmbH, Erlangen (DE)

( * ) Notice: Subject to any disclaimer, the term of this patent is extended or adjusted under 35 U.S.C. 154(b) by 198 days.

(21) Appl. No.: 12/760,590

(22) Filed: Apr. 15, 2010

(65) Prior Publication Data

US 2010/0192368 A1    Aug. 5, 2010

Related U.S. Application Data

(63) Continuation of application No. PCT/EP2008/052715, filed on Mar. 9, 2009.

(30) Foreign Application Priority Data

Mar. 15, 2008  (DE) .......................... 10 2008 014 544

(51) Int. Cl.
*B23P 19/00* (2006.01)
*B23P 6/00* (2006.01)

(52) U.S. Cl. ................ 29/824; 29/723; 29/823; 29/822; 29/402.09

(58) Field of Classification Search ..................... 29/723, 29/824, 823, 822, 402.09; 376/249
See application file for complete search history.

(56) References Cited

U.S. PATENT DOCUMENTS

| | | | | |
|---|---|---|---|---|
| 3,780,571 A | * | 12/1973 | Wiesener | 376/249 |
| 3,936,089 A | * | 2/1976 | Hoffmeister | 294/86.4 |
| 3,987,666 A | * | 10/1976 | Blanc et al. | 73/633 |
| 4,196,049 A | * | 4/1980 | Burns et al. | 376/249 |
| 4,436,694 A | * | 3/1984 | Vassalotti et al. | 376/310 |
| 4,584,162 A | * | 4/1986 | Yoli | 376/204 |
| 4,686,078 A | * | 8/1987 | Zwart, Jr. | 376/249 |
| 4,716,010 A | * | 12/1987 | Gallo et al. | 376/260 |
| RE33,373 E | * | 10/1990 | Gallo et al. | 376/260 |
| 4,986,953 A | * | 1/1991 | Bernard | 376/245 |
| 5,070,589 A | * | 12/1991 | Howell et al. | 29/426.5 |
| 5,102,612 A | * | 4/1992 | McDonald et al. | 376/203 |

(Continued)

FOREIGN PATENT DOCUMENTS

DE 39 13 202 A1 10/1990
DE 39 16 186 A1 11/1990

(Continued)

OTHER PUBLICATIONS

International Search Report of PCT/EP2009/052715, dated Jul. 15, 2009.

*Primary Examiner* — Essama Omgba
(74) *Attorney, Agent, or Firm* — Laurence S. Greenberg; Werner H. Stemer; Ralph E. Locher

(57) ABSTRACT

A device is provided for repairing a damaged location in an underwater region of a wall of a vessel or pool, in particular in the region of a wall of a pool of a nuclear reactor plant. The device includes a guiding system, which can be attached along a side wall at a distance therefrom and can be fixed thereto, for guiding a carriage which can be made to move in a longitudinal direction of the guiding system. Arranged on the carriage is a displaceably mounted holder for a repair support, which can be placed with an adhesive surface against the wall region containing the damaged location. With such a device, wall regions that are at a great depth and can only be accessed through narrow gaps can be repaired quickly and reliably.

12 Claims, 4 Drawing Sheets

U.S. PATENT DOCUMENTS

| | | | |
|---|---|---|---|
| 5,193,405 A * | 3/1993 | Oomichi et al. | 73/865.8 |
| 5,243,631 A * | 9/1993 | Cearley et al. | 376/260 |
| 5,348,613 A * | 9/1994 | Blais | 156/579 |
| 5,359,632 A * | 10/1994 | Bottoms et al. | 376/203 |
| 5,519,741 A * | 5/1996 | Suzuki et al. | 376/249 |
| 5,878,099 A * | 3/1999 | Burrows et al. | 376/260 |
| 6,064,708 A * | 5/2000 | Sakamaki | 376/249 |
| 6,219,399 B1 * | 4/2001 | Naruse et al. | 376/245 |
| 6,536,283 B1 * | 3/2003 | Hatley | 73/622 |
| 6,555,779 B1 | 4/2003 | Obana et al. | |
| 7,092,477 B2 * | 8/2006 | Wivagg et al. | 376/249 |
| 7,267,019 B2 * | 9/2007 | Morris et al. | 73/865.8 |
| 7,769,123 B2 * | 8/2010 | Rowell et al. | 376/249 |
| 8,111,802 B2 * | 2/2012 | Rowell et al. | 376/249 |
| 8,291,564 B2 * | 10/2012 | Jones et al. | 29/402.01 |
| 2005/0013401 A1 * | 1/2005 | Markling et al. | 376/263 |
| 2005/0265510 A1 * | 12/2005 | Jennings et al. | 376/260 |
| 2006/0231964 A1 * | 10/2006 | Woods | 264/36.2 |
| 2007/0125190 A1 * | 6/2007 | Morris et al. | 73/865.8 |
| 2007/0140403 A1 * | 6/2007 | Yuguchi et al. | 376/249 |
| 2008/0205575 A1 * | 8/2008 | Morris et al. | 376/249 |
| 2008/0317192 A1 * | 12/2008 | Rowell et al. | 376/249 |

FOREIGN PATENT DOCUMENTS

| | | |
|---|---|---|
| DE | 100 26 649 A1 | 12/2001 |
| DE | 10 2005 058 493 A1 | 6/2007 |
| FR | 2905030 A1 * | 2/2008 |
| JP | 04309890 A * | 11/1992 |
| JP | 2003-156586 A | 5/2003 |
| JP | 2009066635 A * | 4/2009 |

* cited by examiner

APPARATUS FOR REPAIRING A DAMAGED AREA IN AN UNDERWATER WALL REGION OF A VESSEL OR POOL

CROSS-REFERENCE TO RELATED APPLICATION

This is a continuation application, under 35 U.S.C. §120, of copending international application PCT/EP2009/052715, filed Mar. 9, 2009, which designated the United States; this application also claims the priority, under 35 U.S.C. §119, of German patent application DE 10 2008 014 544.0, filed Mar. 15, 2008; the prior applications are herewith incorporated by reference in their entirety.

BACKGROUND OF THE INVENTION

Field of the Invention

The invention relates to an apparatus for repairing a damaged area in an underwater wall region of a vessel or pool, in particular in a wall region of a pool in a nuclear reactor plant.

The wall surfaces (side walls and bottom surface) of water-flooded pools in a nuclear reactor plant, for example the reactor pit or the fuel assembly storage pool, are provided with a liner of steel plates which are welded together. The welds by which the steel plates are welded to one another or to a substructure are vulnerable to chlorine-induced stress corrosion cracking owing to mechanical stresses inevitably occurring during welding. In order to prevent pool water from escaping through such cracks into the concrete wall, they need to be sealed. In order to ensure sufficient shielding of the maintenance staff against radioactive radiation during such a repair, the water cannot be drained, in particular in a fuel assembly storage pool which is loaded with fuel assemblies, and therefore the repairs must take place under water. The side wall regions in such a fuel assembly storage pool, however, are not easily accessible since only a small gap is available between the fuel assembly storage rack, located in the fuel assembly storage pool, and the side walls.

In principle it is known, for example from published, non-prosecuted German patent application DE 100 26 649 A1, to seal such cracks by applying an adhesive or by adhesively bonding repair overlays onto them. To this end, the repair overlay was affixed either manually by a diver or using a linkage system on the wall which is operated from the pool edge. However, it is not possible to repair, in this fashion, damaged areas which are not easily accessible and are located at great depth under the water surface.

SUMMARY OF THE INVENTION

It is accordingly an object of the invention to provide an apparatus for repairing a damaged area in an underwater wall region of a vessel or a pool, in particular in the wall region of a pool in a nuclear reactor plant, which overcomes the above-mentioned disadvantages of the prior art devices of this general type, by which it is possible to repair even areas which are not easily accessible.

The problem stated is achieved according to the invention by way of an apparatus which contains a guidance system, which can be attached along a side wall at a distance therefrom and fixed thereto, for guiding a carriage which is displaceable in a longitudinal direction of the guidance system. Arranged on the guidance system is a displaceably mounted holder for a repair overlay which can be placed, by way of an adhesive surface, against the wall region containing the damaged area.

Such an apparatus can be used to reach side wall regions and edge regions of the bottom surface which adjoin the side wall regions, both of which, wall regions and edge regions, are accessible only via a narrow gap due to fixtures located inside the pool, such as the fuel assembly storage racks in a fuel assembly storage pool.

The use of a carriage, which can be placed on rails on the guidance system, which is fixed to the side wall, and is displaceable in the longitudinal direction of the guidance rail, for transporting the repair overlay to the damaged area can make it possible to bring a repair overlay, which is provided with a viscous flowable adhesive, into the correct work position very quickly since the position was previously locationally fixed by way of the attachment of the guidance rail. In other words, the guidance rail can be attached and positioned very precisely without any time pressure, since the repair overlay, which is provided with the adhesive, is not transported to the damaged area until the guidance rail has been installed.

If the carriage is not motorized and displaceable into an end position exclusively by the action of gravity, the configuration of the apparatus is simplified considerably.

Installing the guidance system in situ is simplified if it is assembled from sections which are releasably connected to one another.

The guidance system is preferably composed of two parallel guidance rails. In this manner it is possible to better absorb the forces and torques acting on the guidance system via the carriage when the repair overlay is pressed against the wall.

A particularly simple way of fastening the guidance system to the side wall is possible if suction cups, which are connected to a suction line, are arranged on the guidance system.

Positioning of the guidance rails in narrow gaps is simplified if at least one suction cup is mounted on the guidance system such that it is displaceable transversely to the longitudinal direction thereof.

Safe transport of the repair overlay to the repair area is permitted if the repair overlay can be fixed in the holder by producing a negative pressure on a rear side which is applied to the adhesive surface. Owing to this measure it is also possible to simply remove or release the repair overlay when the latter is permanently fixed to the wall once the adhesive has cured.

High pressure forces for a secure adhesive bond are achieved in particular when the holder is pneumatically displaceable.

In a particularly advantageous embodiment of the invention, the apparatus contains a frame which surrounds the holder and is mounted displaceably in the advancement direction of the holder with a bias relative thereto, the frame having a lip which extends into the interior space surrounded by the frame and the inner edge of which is aligned with the outer edge of the repair overlay in the advancement direction and protrudes beyond the repair overlay in a starting position. This measure prevents the adhesive, which seeps out laterally when the repair overlay is pressed against the wall region to be repaired, from spreading on the wall outside the repair overlay or from dripping off.

If there is also a collection space located between the frame and the holder and surrounding them, the adhesive which is wiped off by the lip is reliably captured and does not reach the pool interior.

The lip preferably consists of a spring plate with the result that the lip bears against the wall as uniformly and tightly as possible.

Other features which are considered as characteristic for the invention are set forth in the appended claims.

Although the invention is illustrated and described herein as embodied in an apparatus for repairing a damaged area in an underwater wall region of a vessel or a pool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
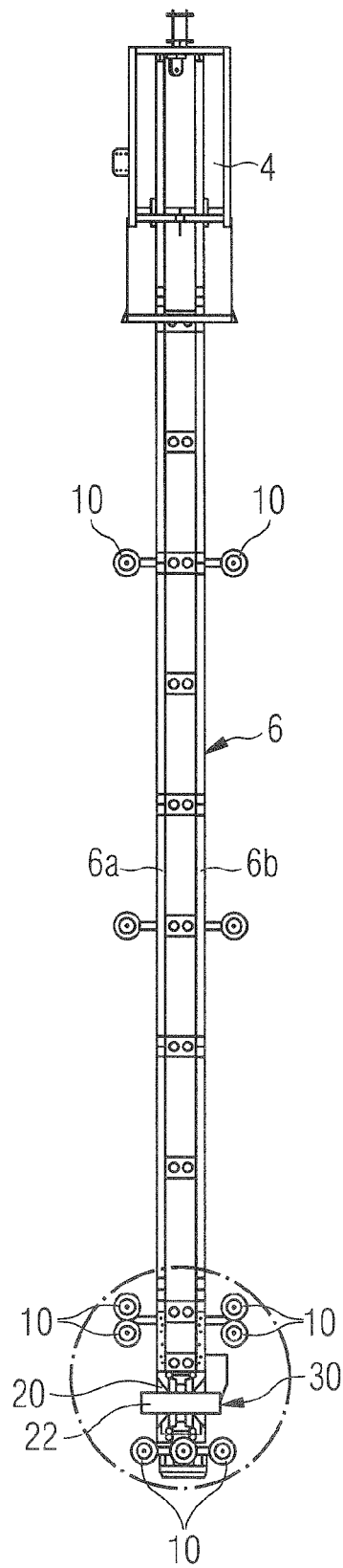
FIG. 2 is a diagrammatic, plan view of the apparatus.
Figure 1:
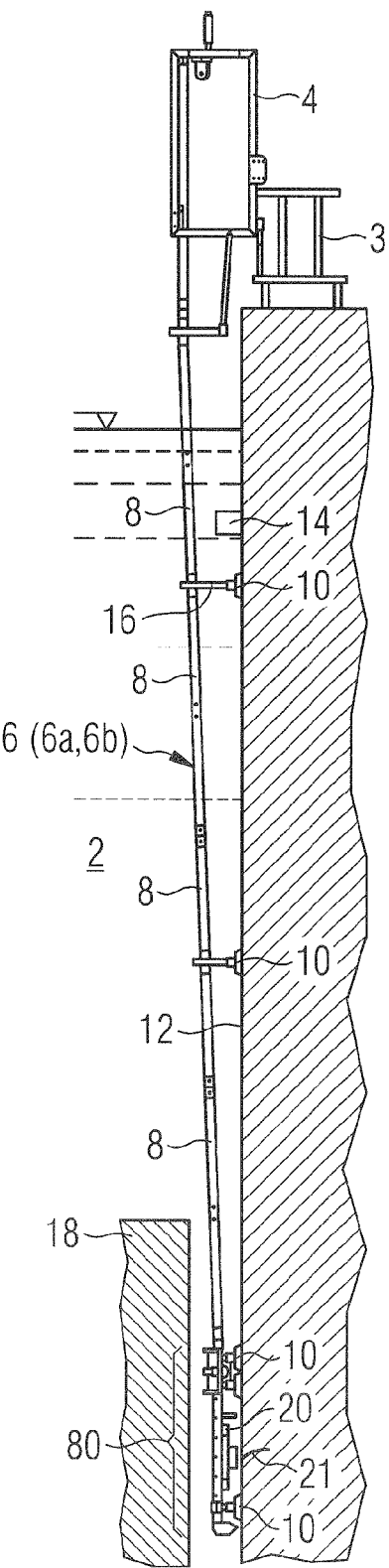
FIG. 1 is a diagrammatic, side view of an apparatus in a work position in a fuel assembly storage pool according to the invention.

Referring now to the figures of the drawing in detail and first, particularly, to FIGS. 1 and 2 thereof, there is shown an apparatus according to the invention in a work position in a water-flooded fuel assembly storage pool 2 of a nuclear reactor plant. The apparatus contains a supporting frame 4, held in a rack 3 which is placed at a pool edge, for a guidance system 6, which extends in a longitudinal direction, is composed of two mutually parallel guidance rails 6a, 6b and is assembled from a plurality of sections 8. Arranged on the guidance system 6, or on the guidance rails 6a, 6b, is a plurality of suction cups 10 which can be supplied with negative pressure via a non-illustrated suction line and can in this manner fix the guidance system 6 to a side wall 12, which extends vertically in the example, at a distance therefrom.

In the exemplary embodiment, the guidance system 6 is linear in an upper region and inclined with respect to the side wall 12 in order to thus bridge fixtures 14 which are located in the upper region of the fuel assembly storage pool 2 and shown schematically in FIG. 1. The inclined region merges at the free end of the guidance system 6 into an end section 80 which is parallel to the wall surface 12 and is connected in an articulated manner to the neighboring section 8 with limited clearance.

The suction cups 10 are arranged in each case in pairs at a free end of the limbs of U-shaped retaining brackets 16, which grip around the guidance rails 6a, 6b, with the length of the limbs decreasing according to the necessary inclination as the distance from the supporting frame 4 increases.

The free end of the guidance system 6 is inserted into a gap between the side wall 12 and a fuel assembly storage rack 18 (illustrated schematically) and fixed to the wall likewise via the plurality of suction cups 10. FIG. 1 shows a situation in which a carriage 20, which is placed onto the guidance rails 6a, 6b of the guidance system 6 and support a repair overlay 22 which is provided with an adhesive surface, is in the work position at a damaged area 21 in the side wall 12. The work position is locationally fixed by way of the position of end stops for the carriage 20 on the guidance system 6. The damaged area 21 and the exact position thereof was found in a prior examination and measured, such that the guidance system 6 can be positioned accurately—position at the pool edge and depth position. The carriage 20 is not motorized and is lowered into the work position using a cable winch located on the supporting frame 4 into its end position exclusively under the action of gravity.

It can be seen from the plan view according to FIG. 2 that the suction cups 10 are arranged on both sides of the guidance rails 6a, 6b such that they are at a distance therefrom in order to permit the carriage 20 to pass between them. FIG. 2 also shows that the number of suction cups 10 is higher in the region of the free end of the guidance system 6 in order to absorb the opposing forces resulting from pressing the repair overlay 22, which is transported by the carriage 20, against the wall and to ensure that the guidance system 6 remains in its fixed location on the side wall 12.

Figure 3:
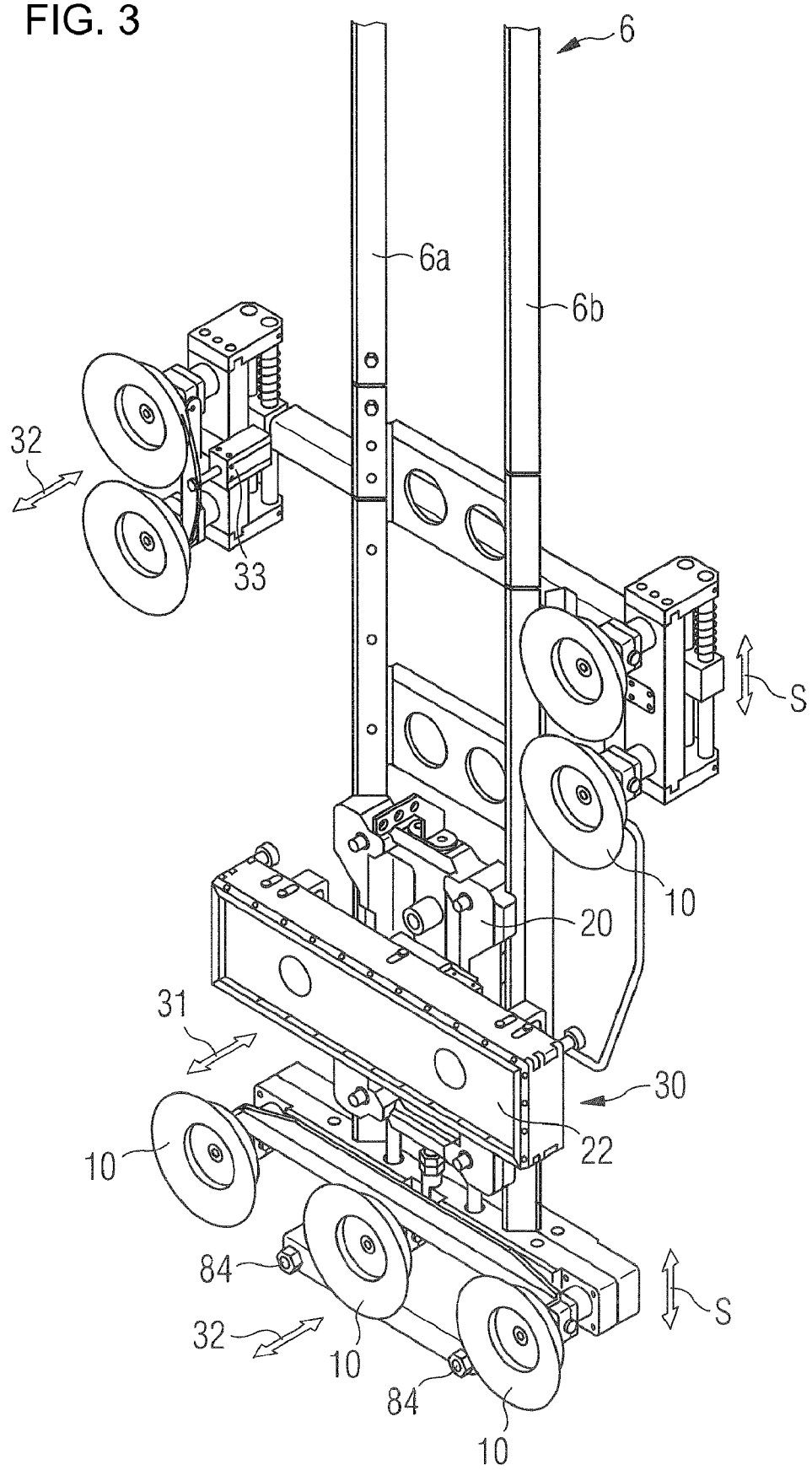
FIG. 3 is a diagrammatic, perspective view of a lower part of the apparatus with a carriage, which holds a repair overlay, in an end position.

The enlarged perspective illustration of the end section 80 according to FIG. 3 shows that the carriage 20, which is moved into its end position up to a stop, supports a holder 30 which is mounted on the carriage 20 such that it can be displaced transversely to the longitudinal direction of the guidance system 6 into an advancement direction 31 (indicated by an arrow) and holds the repair overlay 22. Seven suction cups 10, which can be deployed preferably pneumatically in each case using pneumatic cylinders, of which only pneumatic cylinder 33 of the suction cup pair shown on the left can be seen, in pairs (the upper four suction cups 10) or in a group of three (the lower three suction cups 10) in the direction of the double-headed arrow 32 transversely to the longitudinal direction of the guidance system 6, are provided in the exemplary embodiment in order to fix the end section 80 in the region of the repair area. This has the advantage that the suction cups 10 located in the region of the free end can, when the guidance system 6 is inserted into the narrow gap, be moved back into a position which makes the insertion into the narrow gap, which is located at a depth of about 10 m under the water, easier. Once the apparatus has been positioned on the side wall 12, the suction cups 10 can be placed against the side wall 12 and fixed to it by the application of negative pressure. The distance available to the carriage 20 from the side wall 12 can be increased by further extending the suction cups 10.

The suction cups 10 are spring-mounted relative to the guidance system 6 in the longitudinal direction with limited clearance S in both directions (toward the free end and away therefrom), with the result that once the suction cups 10 have been fixed to the side wall 12, later adjustments to the carriage in the longitudinal direction are still possible by way of displacing the guidance system 6 in this direction.

In order to facilitate the guidance of the apparatus along the side wall 12 and the insertion of the end section 80 into the gap, the end section 80 has, at the distal end, rollers or bearing balls 34 which can roll along the wall.

Figure 4:
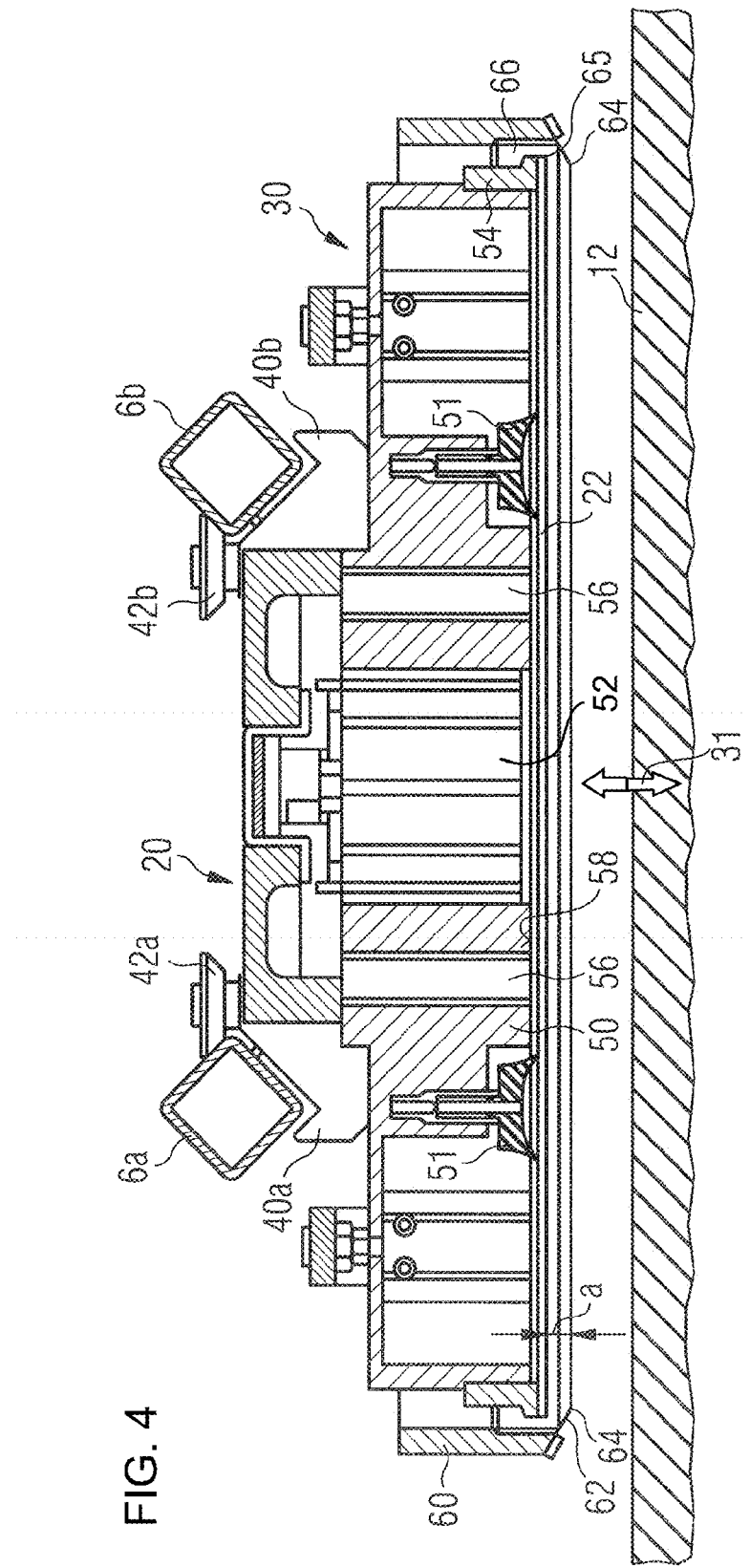
FIG. 4 is a diagrammatic, cross-sectional view through the carriage with the repair overlay located thereon.

According to FIG. 4, the guidance rails 6a, 6b have, in the exemplary embodiment, a profile which is square in cross section. The carriage 20 has U-shaped runners 40a, 40b, the bases of which are inclined with respect to each other—90° in the example—and by which the carriage 20 is placed onto the guidance rails 6a, 6b. One limb of the U-shaped runner 40a, 40b is here formed in each case by a conical roller 42a, 42b which bears against a side surface of the guidance rail 6a or 6b in each case by way of its conical surface. Owing to the mutually inclined arrangement of the bases of the U-shaped runners 40a, 40b, the carriage 20 is secured transversely to the longitudinal direction of the guidance system 6 (vertically with respect to the plane of the drawing in the figure) on the guidance rails 6a, 6b.

The holder 30 arranged on the carriage 20 contains a punch 50 which is displaceable, using a pneumatic unit 52, transversely to the longitudinal direction of the guidance system 6 in the direction of the double-headed arrow 31. The punch 50 is surrounded by a supporting frame 54 which is mounted axially such that it is displaceable relative to it and on which the repair overlay 22, which is provided with adhesive (not shown in the figure for reasons of clarity) on the flat side which is remote from the punch, is placed by way of its edge.

A plurality of suction cups 51, by which the repair overlay 22 is fixed in the holder 30 for transport, is likewise axially spring-mounted in the punch 50. In order to enhance the stability, guidance studs 56, which guide the punch 50 during operation of the pneumatic unit 52, are additionally provided.

The holder 30 is additionally surrounded by a frame 60, which is mounted such that it is axially displaceable to it and which contains a lip 62, consisting for example of an angled-away spring plate, which extends into the interior space surrounded by the frame 60 and an inner edge 64 of which is aligned with an outer edge 65 of the repair overlay 22 in the advancement direction 31. In a starting position, the inner edge 64 protrudes beyond the repair overlay 22 by a distance a and is biased with respect to the holder 30 with the aid of pneumatic cylinders having a specified force.

Advancing the holder 30 with the aid of the pneumatic unit 52 causes the lip 62 to first touch the side wall 12, before the latter comes into contact with the adhesive surface of the repair overlay 22 which is provided with the adhesive. As the holder 30 is advanced further, the bias of the frame 60 is overcome and the adhesive surface of the repair overlay 22 comes into contact with the wall surface of the side wall 12, wherein a gap between the rear side of the repair overlay 22 and a contact pressure surface 58 of the holder 30 is closed when the contact pressure force is increased by way of the spring-mounted suction cups 51, with the result that an areal contact pressure force occurs. While the repair overlay 22 is pressed against the wall surface, the excess adhesive which seeps out laterally is wiped off by the lip 62 into a collection space 66 which is located between the frame 60 and the holder 30 and surrounds it. The contact pressure force is maintained until the adhesive is cured. When the adhesive is cured, the suction cups 51 are aerated, the punch 50 is withdrawn and the carriage 20 is pulled up with the aid of the cable winch.

In principle it is also possible to modify the apparatus which is explained in more detail in FIGS. 1 to 4 in a manner such that it is made possible to repair the edge regions of the bottom surface which adjoin the side walls, for example by arranging the holder for the repair overlay such that it can pivot relative to the carriage, with the result that the repair overlay can even be placed or pressed against surfaces, which are inclined or oriented at right angles to the longitudinal direction of the guidance system, by way of advancing the holder.

Figure 5:
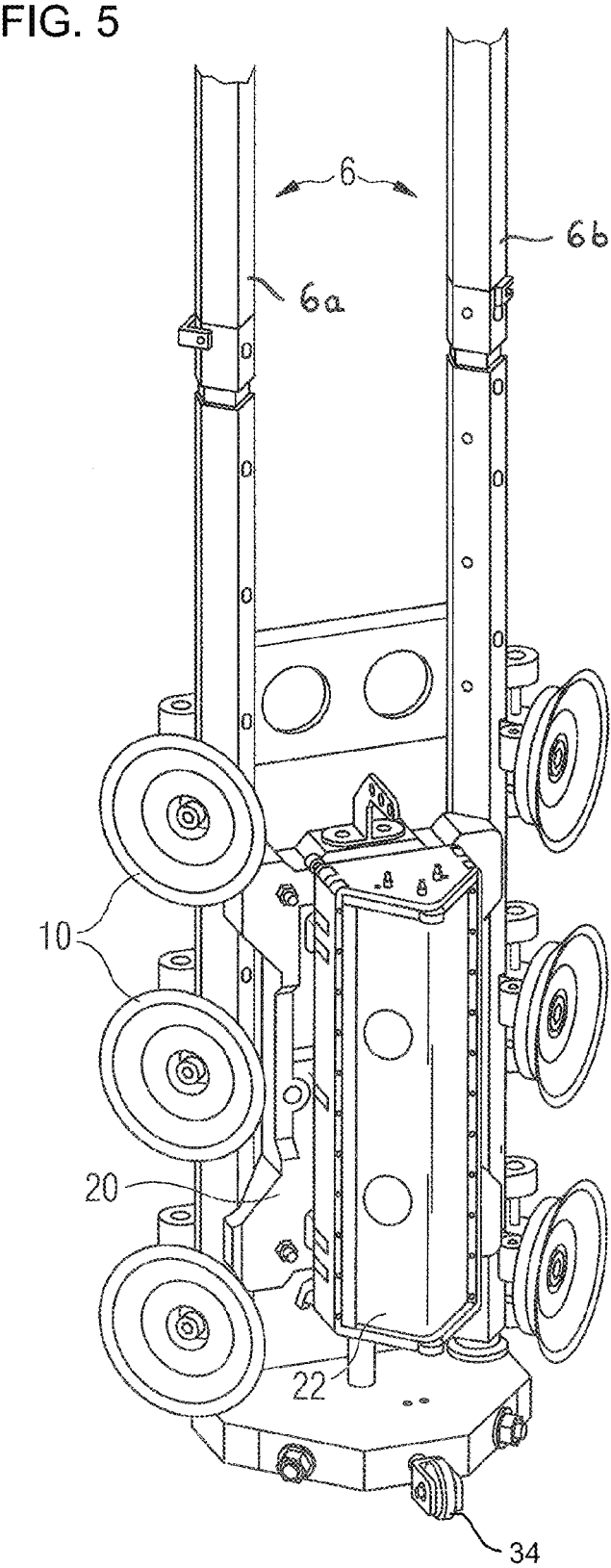
FIG. 5 is a diagrammatic, perspective view of an alternative embodiment of the apparatus according to the invention, which is suitable for repairs in the region of an inner edge.

The apparatus according to the invention is also not only suitable for adhesively bonding planar wall surfaces, but can also correspondingly be fitted to differently shaped wall surfaces by repair overlays which are matched to the respective contour of the wall. FIG. 5 shows such an exemplary embodiment. For the purpose of repairing a damaged area in the region of a side edge of a pool, an angle profile as the repair overlay 22 with a holder, which has been correspondingly modified in terms of its configuration, and the guidance system 6 with the suction cups 10, which are correspondingly aligned with respect to one another at 90° and can be used to fix the guidance system to two adjoining side walls, are provided in this case. The holder is mounted on the carriage 20 such that it is displaceable transversely to the longitudinal direction of the guidance system 6 in this exemplary embodiment, too. Accordingly, cylindrical vessels or tubes can also be repaired using holders, guidance systems and repair overlays which are adapted correspondingly in terms of design.

We claim:

1. An apparatus for repairing a damaged area in an underwater wall region of one of a vessel and a pool, including the underwater wall region of a pool in a nuclear reactor plant, the apparatus comprising:
a carriage;
a displaceably mounted holder disposed on said carriage, said holder configured for holding a repair overlay having an adhesive surface for placement against the damaged area of the underwater wall region; and
a guidance system for being attached and fixed exclusively to a side wall having the damaged area to be repaired with the overlay and at a distance from the side wall, said guidance system configured for receiving said carriage thereon after being attached and fixed to the side wall and for guiding said carriage, said carriage being displaceable in a longitudinal direction of said guidance system for guiding said holder with the repair overlay to the damaged area of the underwater wall region;
said holder containing a punch displaceable in a guided manner transversely to the longitudinal direction of the guidance system.

2. The apparatus according to claim 1, wherein said carriage is not motorized and displaceable into an end position exclusively by an action of gravity.

3. The apparatus according to claim 1, wherein said guidance system is formed from sections which are releasably connected to one another.

4. The apparatus according to claim 1, wherein said guidance system is composed of two parallel guidance rails.

5. The apparatus according to claim 1, further comprising a plurality of suction cups disposed on said guidance system and connected to a suction line for fixing said guidance system to the side wall.

6. The apparatus according to claim 5, wherein at least one of said suction cups is mounted on said guidance system such that it is displaceable transversely to the longitudinal direction thereof.

7. The apparatus according to claim 1, wherein said repair overlay can be fixed in said holder by producing a negative pressure on a rear side which is remote from the adhesive surface.

8. The apparatus according to claim 1, wherein said holder is pneumatically displaceable.

9. An apparatus for repairing a damaged area in an underwater wall region of one of a vessel and a pool, including the underwater wall region of a pool in a nuclear reactor plant, the apparatus comprising:
a carriage;
a displaceably mounted holder disposed on said carriage, said holder configured for holding a repair overlay having an adhesive surface for placement against the damaged area of the underwater wall region;
a guidance system for being attached and fixed to a side wall at a distance from the side wall, said guidance system guiding said carriage, said carriage being displaceable in a longitudinal direction of said guidance system for guiding said holder with the repair overlay to the damaged area of the underwater wall region; and a frame surrounding said holder and mounted displaceably in an advancement direction of said holder with a bias relative thereto, said frame having a lip extending into an interior space surrounded by said frame and an inner edge of said frame is aligned with an outer edge of the repair overlay in the advancement direction and protrudes beyond the repair overlay in a starting position.

10. The apparatus according to claim 9, further comprising a collection space located between said frame and said holder and surrounding them.

11. The apparatus according to claim 9, wherein said lip includes a spring plate.

12. The apparatus according to claim 9, wherein said frame is pneumatically biased.

* * * * *